United States Patent [19]

Haddy

[11] Patent Number: 5,576,973
[45] Date of Patent: Nov. 19, 1996

[54] APPARATUS AND METHOD FOR OBTAINING GEOGRAPHICAL POSITIONAL DATA FOR AN OBJECT LOCATED UNDERGROUND

[75] Inventor: Alan Haddy, Oakland, N.J.

[73] Assignee: Radiodetection Limited, Bristol, United Kingdom

[21] Appl. No.: 228,686

[22] Filed: Apr. 18, 1994

[51] Int. Cl.$^6$ .................................................. G01S 13/00
[52] U.S. Cl. ............................................. 364/516; 342/357
[58] Field of Search ...................................... 364/516, 420, 364/449–456; 250/372; 348/144; 356/5.01; 342/357, 358, 459; 324/326–329, 219–220, 228, 331, 521, 522, 529, 530

[56] References Cited

U.S. PATENT DOCUMENTS

| | | | |
|---|---|---|---|
| 4,381,544 | 4/1983 | Stamm | 364/420 |
| 4,390,836 | 6/1983 | Bruce et al. | 324/521 |
| 4,814,711 | 3/1989 | Olsen et al. | 324/331 |
| 4,853,543 | 8/1989 | Ozdemir | 250/372 |
| 4,857,851 | 8/1989 | Anderson et al. | 324/326 |
| 5,045,937 | 9/1991 | Myriuk | 348/144 |
| 5,155,490 | 10/1992 | Spradley, Jr. et al. | 342/357 |
| 5,166,789 | 11/1992 | Myrick | 348/144 |
| 5,191,385 | 3/1993 | Kasser | 356/5.01 |
| 5,294,937 | 3/1994 | Ostteen et al. | 342/459 |
| 5,345,245 | 9/1994 | Ishikawa et al. | 342/357 |
| 5,402,340 | 3/1995 | White et al. | 364/420 |

*Primary Examiner*—James P. Trammell
*Attorney, Agent, or Firm*—Walter H. Dreger, Esq.; Michael A. Kaufman, Esq.

[57] ABSTRACT

Geographical positional data is obtained for an underground object by locating the object using a device that locates underground objects. An apparatus that receives data from a global position system ("GPS") provides data identifying global position of the device, and thus also of the located underground object. A data storage unit stores such positional data, which may be used in the future to re-locate the underground object. The GPS-data receiving apparatus can preferably receive data from at least one overhead GPS satellite and from a secondary stationary receiver. Data from the secondary stationary receiver may be modulated on to a signal transmitted along a detected underground cable object.

14 Claims, 2 Drawing Sheets

APPARATUS AND METHOD FOR OBTAINING GEOGRAPHICAL POSITIONAL DATA FOR AN OBJECT LOCATED UNDERGROUND

FIELD OF THE INVENTION

The present invention relates to a locating device and in particular to a locating device for locating an underground object such as a cable or pipe.

BACKGROUND OF THE INVENTION

Various types of locating devices e.g. for underground cables, are known. One such device, produced by the applicants, detects a magnetic field produced by an electric current in an underground cable using a pair of detector coils. The device gives an indication of when the user is directly above a portion of the buried underground cable. Typically, the user then marks the position of the cable on the ground surface and then moves along the cable detecting further portions of it. Thus the position of the length of cable can be determined.

Once the position of the cable has been determined it is useful to record this for future reference. Traditionally this would be done by simply recording, for example, that the cable lies a certain distance from the edge of a road, or alternatively by marking the cable on a map using conventional map surveying techniques.

Such recordal methods give rise to the problem that, when the user returns at a later date to re-locate the cable, they may need to re-use complex surveying techniques to relate the information on the map to the actual location. There is also the possibility that the physical feature (such as, in the above example, the road) which references the location of the cable has been moved. These problems render the repeatability of locating the cable more difficult, and furthermore involve the use of skilled techniques.

The present invention aims to reduce the complexity of recording the location of an underground object, such as a cable, and to increase the ease with which the object can be re-located.

SUMMARY OF THE INVENTION

Accordingly, the present invention provides a locating device including underground object locating means; positional data receiving means for receiving data relating to the geographical position of the locating device; and data storage means for storing data relating to the position of the locating device when an underground object as determined by the geographical position of the locating device.

In this way the geographical positional data is stored relating to the location of the underground cable, and may be subsequently retrieved for re-location of the cable.

By using this system, the recordal of the geographical positional data of the underground cable may be permanent, and is not reliant on physical landmarks, e.g. roads etc., nor on the accuracy of a particular mapping system used. Furthermore, there is no need to physically mark the location of the underground cable on the ground surface in order to survey it for mapping, which is necessary even where digital mapping systems are employed.

There exists geographical data sources known as geo-positional satellites (GPS) from which, typically, navigational information is obtained e.g. by sailors or mountaineers. A system utilising such satellite data is sometimes referred to as a Global Positioning System, and the same abbreviation GPS used.

Presently, 24 satellites are in orbit 11,000 miles above the earth (21 satellites are operational, 3 are back-ups). Each satellite contains four atomic clocks and broadcasts time data and other information identifying itself and describing its path. A GPS receiver compares the signals with its own clock(s) and then determines its location in terms of latitude and longitude by calculating the distance between it and the satellites. Typically, data may be obtained from 3 or 4 of the satellites and trigonometrical calculations performed to determine the position of the receiver.

The typical accuracy obtainable using a commercially available receiver is between 20–100 meters for this simple system. The accuracy of the system can be improved by adding data from a second, stationary, receiver and readings can then be refined to within a few centimeters.

Preferably the positional data receiving means include means for receiving GPS data. The positional data receiving means need not be physically located within the body of the locating device—the GPS receiver, for example, could be connected to a datalogger which in turn is connected e.g. via an interface (such as an RS232 interface) to the locating device.

In a preferred embodiment the positional data receiving means receives data from both overhead GPS satellite(s) and a second stationary (differential) receiver, thus improving the accuracy of the geographical location measurement. The data from the differential receiver may be received, for example, by radio transmission such as FM link, or may be transmitted to the locating device via a fibre optic cable sheath. If an FM link is being used, the differential information may be received by the operator via a "beeper" type device, with the beeper being hard wired to the GPS receiver.

The differential information may be provided by a plurality of land-based receivers—for example in the USA a network of around 300 FM stations provides the differential signal. A land station may be up to, for example, 200 miles away and still transmit receivable differential data.

For the type of locating device described earlier, where the device detects the magnetic field produced by a current passing through an underground cable, the differential data may be modulated on to the signal which is passed through the cable. The locating device may then receive the data from the signal in the cable, for example using the two detection coils, thus removing the need for FM reception of the differential data. Since the rate of update of the GPS information is relatively slow, the typical modulation of the data on the cable may be low e.g. 10–20 Hz.

Where the underground cable being located is suitable for carrying long distance data information, e.g. a telephone cable, the differential data may simply be transmitted along the line. Where the cable includes repeater stations, the differential data may be input on to the cable at a repeater station.

Preferably other features of the cable system are recordable. For example the position of cable joints may be recorded using this system together with a datalogger.

The positional data and/or any other data may be recorded in a buried RF identity marker. Such a marker, designed to be interrogated by a suitable transmitter/receiver would be programmed with the longitude/latitude information, and then be buried above or near the target line cable; this data could also be recorded on a map of the target area (such maps being commonly called 'asbuilts' by A.T.&T and others). The map could then be used to point the operator to the area in which the market tag should be found next time location is required.

Once the data relating to the position of the cable has been logged it may then be stored and manipulated in any required fashion. In a second aspect the present invention relates to a locating device including positional data receiving means for receiving data relating to the geographical position of the locating device; data storage means containing data relating to the location of an underground object; means for comparing the data stored in the data storage means with the data received by the positional data receiving means; and means for producing a warning signal when said means for comparing indicate that the underground object is within a predetermined distance of the locating device.

In other words, preferably the data relating to the location of the underground cable may be stored in a "beeper" type device, which device is also capable of receiving GPS data and comparing the received GPS data with the stored cable location data and producing an appropriate output when the two sufficiently coincide.

Such a device could, for example, be carried by workmen in order to prevent inadvertent interference with a given underground cable.

The present invention also relates to a method of recording the position of a underground object, including the steps of:

(a) locating the object with a locating device;

(b) receiving positional data relating to the geographical position of the locating device; and (c) storing data relating to the position of the underground object as determined by the geographical position of the locating device.

BRIEF DESCRIPTION OF THE DRAWINGS

An embodiment of the present invention will now be described with reference to the accompanying drawings in which.

DETAILED DESCRIPTION OF THE PREFERRED EMBODIMENTS

Figure 1:
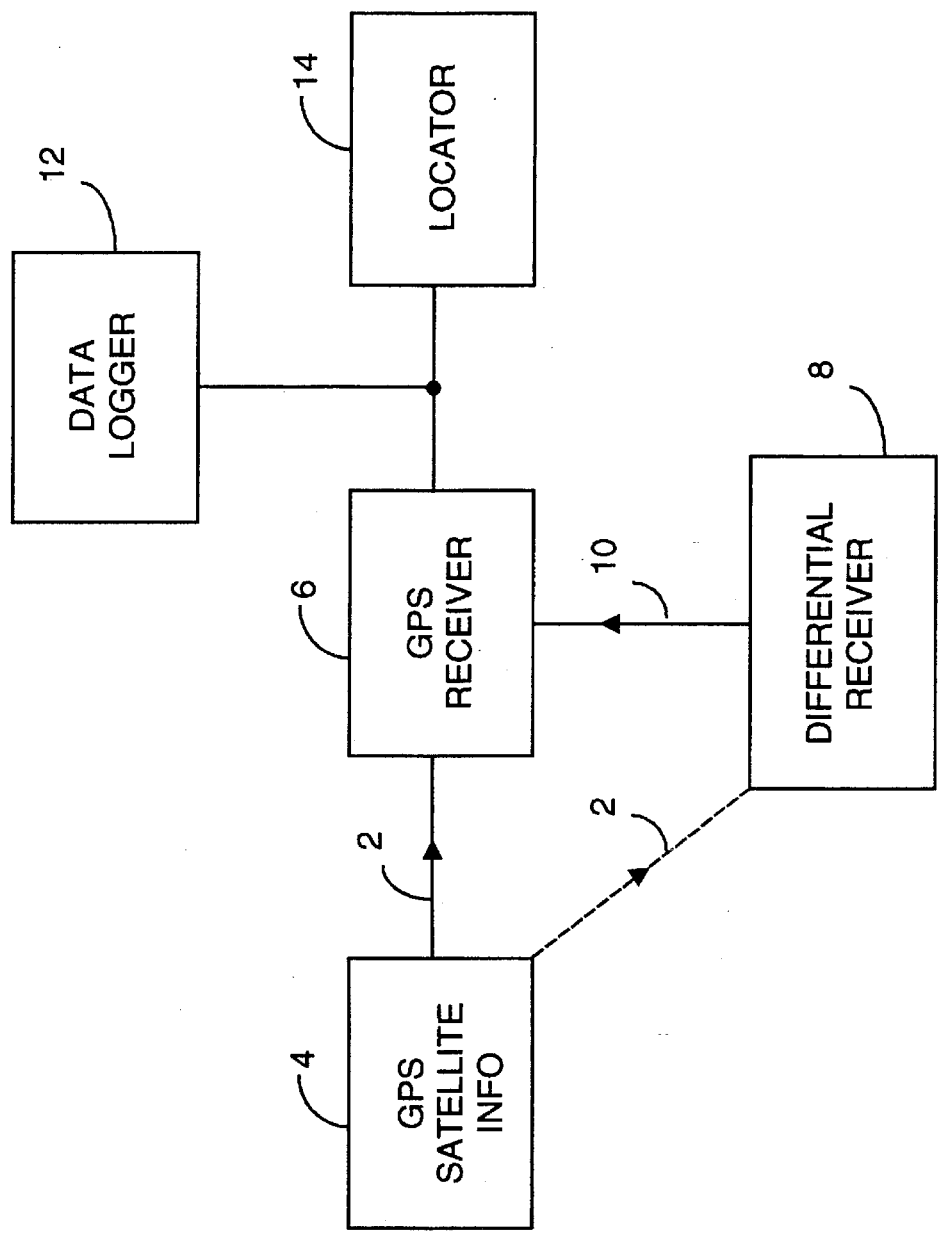
FIG. 1 is a block diagram of a system according to one aspect of the present invention.

In FIG. 1 GPS information 2 is produced by one or more GPS satellites 4. The positional information 2 is transmitted to a GPS receiver 6 and a differential receiver 8. The differential receiver 8 in turn transmits differential information 10 to the GPS receiver 6. The differential information 10 may be transmitted, for example, via an FM link, along a fibre optic cable sheath or by modulating an electrical signal along the cable to be located/logged.

The GPS receiver 6 transmits information to a datalogger 12. The data logger 12 also receives information from a locating device 14 which is used to locate, for example, an underground cable. The GPS receiver 6 and/or the datalogger 12 may be incorporated in the locator 14 or alternatively either or both of them may be external to the locator 14.

Thus the data logger 12 records information relating to the detection (or otherwise) of the underground cable and to the Geographical location of the locating device. The location of the underground cable may then be recorded.

Figure 2:
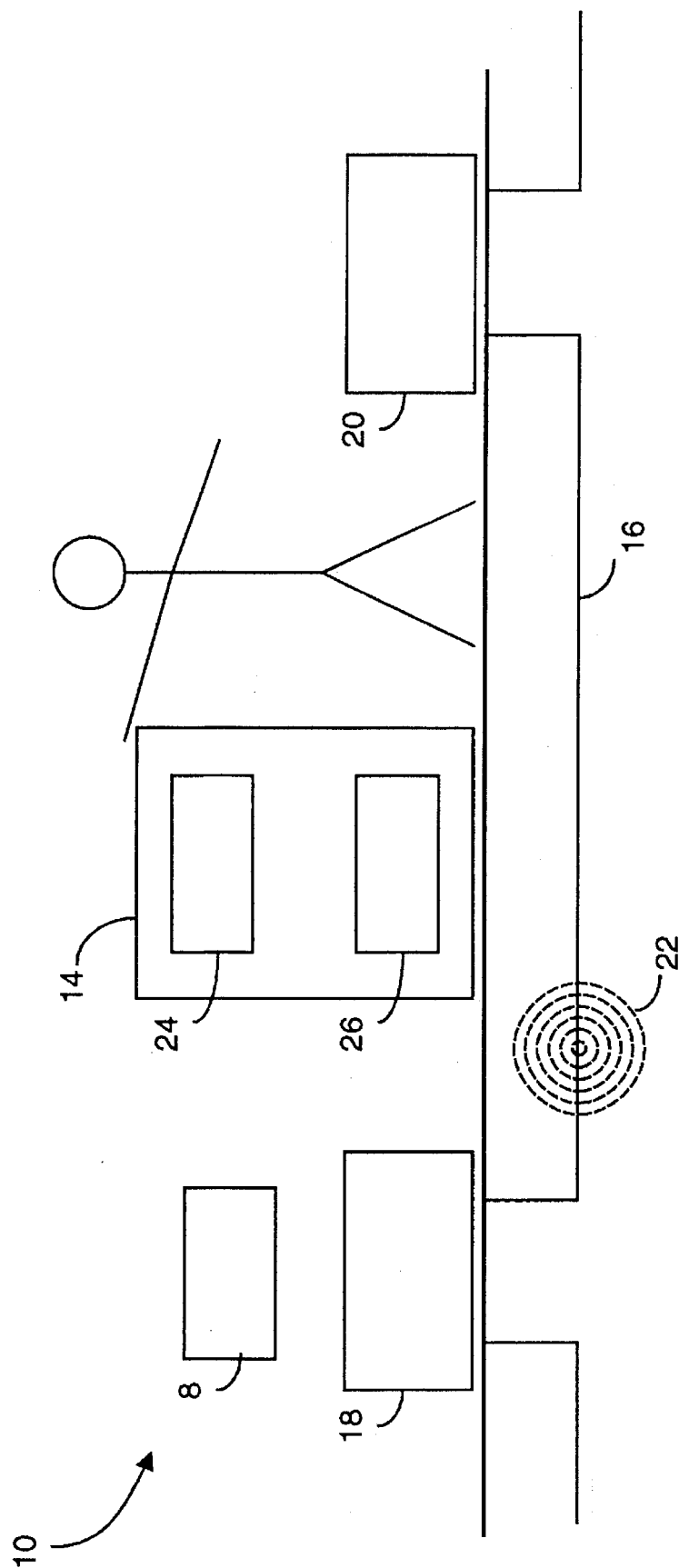
FIG. 2 is a schematic diagram of an embodiment of the present invention.

FIG. 2 shows a schematic diagram of a locating device 14 being used to locate an underground cable 16. The underground cable 16, for example a telephone cable, includes repeater stations 18, 20 to amplify the data signal as it passes along the cable 16. The cable is located by introducing a signal, for example at a repeater station, on to the cable and detecting the magnetic field 22 produced by the signal on the cable. The signal introduced on to the cable for this purpose may be, e.g. between 5 Hz and 100 KHz and is typically around 500 Hz. Two detecting coils 24, 26 in the locating device 14 are used to detect the magnetic field 22.

Additionally, the locator 14 includes a GPS receiver 6 for reception of GPS positional data. Differential data 10 is input on to the cable using a differential receiver 8 at the repeater station 18. The differential data 10 may be modulated on to the cable signal, for example at a modulation frequency of 10–20 Hz. This differential data is received by the locater 14 using the reception means such as the detection coils 24, 26.

Various modifications to the invention may be envisaged. For example the differential data could be received by the GPS receiver by means other than an FM link or signal modulation. Additionally, the GPS receiver could be located remote from the locater and/or data logger and the positional data transmitted to the data logger via other conventional transmission methods.

What is claimed is:

1. An underground cable locating device including:

underground cable locating means for locating an underground object, the means including two detection coils for detecting a magnetic field produced by a current passing through the underground cable;

positional data receiving means for receiving data from a Global Positioning System (GPS) relating to the geographical position of the locating device, including means for receiving data from both at least one overhead GPS satellite and a second stationary receiver;

data storage means (12) for storing data relating to the position of the underground object as determined by the geographical position of the locating device; and means for receiving data from the stationary receiver that has been modulated on to a signal that is transmitted along the underground cable detected by the locating device, said means including two detection coils for detecting the magnetic field produced by a current passing through the underground cable.

2. A locating device including:

positional data receiving means for receiving data relating to the geographical position of the locating device;

data storage means containing data relating to the location of an underground object;

means for comparing the data stored in the data storage means with the data received by the positional data receiving means; and means for producing a warning signal when said means for comparing indicate that the underground object is within a predetermined distance of the locating device.

3. A locating device including:

underground object locating means for locating an underground object;

positional data receiving means for receiving data from a Global Positioning System (GPS) relating to the geographical position of the locating device, including means for receiving data from both at least one overhead GPS satellite and a secondary stationary receiver; and data storage means for storing data relating to the position of the underground object as determined by the geographical position of the locating device.

4. A locating device including:

underground object locating means for locating an underground object;

positional data receiving means for receiving data from a Global Positioning System (GPS) relating to the geographical position of the locating device, including means for receiving data from both at least one overhead GPS satellite and a secondary stationary receiver, wherein the data from the secondary stationary receiver is receivable by radio transmission; and data storage means for storing data relating to the position of the underground object as determined by the geographical position of the locating device.

5. A locating device including:

underground object locating means for locating an underground object;

positional data receiving means for receiving data from a Global Positioning System (GPS) relating to the geographical position of the locating device, including means for receiving data from both at least one overhead GPS satellite and a secondary stationary receiver, wherein the data from the secondary stationary receiver has been modulated on to a signal which is transmitted along a cable detected by the locating device; and data storage means for storing data relating to the position of the underground object as determined by the geographical position of the locating device.

6. A locating device including:

underground object locating means for locating an underground object;

positional data receiving means for receiving data from a Global Positioning System (GPS) relating to the geographical position of the locating device, including means for receiving data from both at least one overhead GPS satellite and a secondary stationary receiver, wherein the data from the secondary stationary receiver has been modulated on to a signal which is transmitted along a cable detected by the locating device, and the means for receiving the data from the secondary stationary receiver includes two detection coils for detecting the magnetic field produced by a current passing through the underground cable; and data storage means for storing data relating to the position of the underground object as determined by the geographical position of the locating device.

7. An underground cable locating device including:

underground cable locating means for locating an underground cable, the means including two detection coils for detecting a magnetic field produced by a current passing through the cable;

positional data receiving means for receiving data relating to the geographical position of the locating device; and data storage means for storing data relating to the position of the underground cable as determined by the geographical position of the locating device.

8. An underground cable locating device including:

underground cable locating means for locating an underground cable, the means including two detection coils for detecting a magnetic field produced by a current passing through the cable;

positional data receiving means for receiving data from a Global Positioning Systems (GPS) relating to the geographical position of the locating device; and data storage means for storing data relating to the position of the underground cable as determined by the geographical position of the locating device.

9. An underground cable locating device including:

underground cable locating means for locating an underground cable, the means including two detection coils for detecting a magnetic field produced by a current passing through the cable;

positional data receiving means for receiving data from a Global Positioning System (GPS) relating to the geographical position of the locating device, including means for receiving data from both at least one overhead GPS satellite and a secondary stationary receiver; and data storage means for storing data relating to the position of the underground cable as determined by the geographical position of the locating device.

10. A method of recording the position of an underground cable, including the steps of:

(a) locating the cable with a locating device that includes underground cable locating means, the means including two detection coils for detecting a magnetic field produced by a current passing through the cable;

(b) receiving positional data relating to the geographical position of the locating device; and (c) storing data relating to the position of the underground cable as determined by the geographical position of the locating device.

11. A method of recording the position of an underground cable, including the steps of:

(a) locating the cable with a locating device that includes underground cable locating means, the means including two detection coils for detecting a magnetic field produced by a current passing through the cable;

(b) receiving positional data relating to the geographical position of the locating device from a Global Positioning Systems (GPS); and (c) storing data relating to the position of the underground cable as determined by the geographical position of the locating device.

12. A method of recording the position of an underground cable, including the steps of:

(a) locating the cable with a locating device that includes underground cable locating means, the means including two detection coils for detecting a magnetic field produced by a current passing through the cable;

(b) receiving positional data relating to the geographical position of the locating device from a Global Positioning Systems (GPS), including receiving data from both at least one overhead GPS satellite and a secondary stationary receiver; and (c) storing data relating to the position of the underground cable as determined by the geographical position of the locating device.

13. A method of recording the position of an underground cable, including the steps of:

(a) locating the cable with a locating device that includes underground cable locating means, the means including two detection coils for detecting a magnetic field produced by a current passing through the cable;

(b) receiving positional data relating to the geographical position of the locating device from a Global Positioning System (GPS), including receiving data from both at least one overhead GPS satellite and a secondary stationary receiver, wherein the data from the stationary receiver has been modulated on to a signal which is transmitted along a cable detected by the locating device, and said means for receiving the data from the secondary stationary receiver include the two detection coils for detecting the magnetic field produced by a current passing through the underground cable; and (c) storing data relating to the position of the underground cable as determined by the geographical position of the locating device.

14. An underground cable locating device including:

positional data receiving means for receiving data relating to the geographical position of the locating device;

data storage means containing data relating to the location of an underground cable;

means for comparing the data stored in the data storage means with the data received by the positional data receiving means; and means for producing a warning signal when said means for comparing indicate that the underground cable is within a predetermined distance of the locating device.

\* \* \* \* \*